United States Patent
Asano

(10) Patent No.: US 7,461,436 B2
(45) Date of Patent: Dec. 9, 2008

(54) MOUNTING STRUCTURE OF VEHICLE INTERIOR MATERIAL

(75) Inventor: Kazunori Asano, Kanagawa (JP)

(73) Assignee: Piolax, Inc., Kanagawa (JP)

( * ) Notice: Subject to any disclaimer, the term of this patent is extended or adjusted under 35 U.S.C. 154(b) by 0 days.

(21) Appl. No.: 11/257,389

(22) Filed: Oct. 25, 2005

(65) Prior Publication Data
US 2006/0085955 A1   Apr. 27, 2006

(30) Foreign Application Priority Data
Oct. 26, 2004   (JP) .................. P2004-311456

(51) Int. Cl.
   E04F 19/02   (2006.01)
   F16B 5/12   (2006.01)
   F16B 5/06   (2006.01)
(52) U.S. Cl. .......................... 24/297; 24/453
(58) Field of Classification Search .............. 24/297, 24/581.11, 453, 458, 289, 295; 296/1.08, 296/146.7
See application file for complete search history.

(56) References Cited

U.S. PATENT DOCUMENTS

| | | | |
|---|---|---|---|
| 4,708,895 A * | 11/1987 | Mizusawa ................. | 24/297 |
| 5,966,782 A | 10/1999 | Ishihara et al. | |
| 6,074,150 A * | 6/2000 | Shinozaki et al. ........... | 24/297 |
| 6,317,937 B1 * | 11/2001 | Ishihara et al. .............. | 24/297 |
| 6,353,981 B1 * | 3/2002 | Smith ....................... | 24/295 |
| 6,449,814 B1 * | 9/2002 | Dinsmore et al. ........... | 24/297 |
| 6,665,914 B2 * | 12/2003 | Ogawa ..................... | 24/297 |
| 6,796,006 B2 * | 9/2004 | Hansen .................... | 24/297 |

FOREIGN PATENT DOCUMENTS

| | | |
|---|---|---|
| JP | 1067403 | 4/2000 |
| JP | 2005-76644 | 3/2005 |
| JP | 2005-233255 | 9/2005 |

\* cited by examiner

*Primary Examiner*—Robert J Sandy
(74) *Attorney, Agent, or Firm*—McGinn IP Law Group, PLLC

(57) ABSTRACT

A mounting structure of a vehicle interior material, includes: a boss part protruded from a rear surface of a vehicle interior material; a clip which has a U-shaped body; a mounting hole punched through the vehicle body; a first engaging piece to be engaged with an engaging hole provided on the boss part; a second engaging piece that faces the engaging hole; and an inclined shoulder to be locked by an edge of the mounting hole, wherein: the vehicle interior material is mounted on a vehicle body by locking the boss part in the mounting hole; the first engaging piece is formed on an inner surface of one sidewall, and the second engaging piece is formed on an inner surface of the other sidewall of the U-shaped body; and the inclined shoulder is form on the upper outer surface of the other sidewall.

13 Claims, 8 Drawing Sheets

MOUNTING STRUCTURE OF VEHICLE INTERIOR MATERIAL

BACKGROUND OF THE INVENTION

1. Field of the Invention

The present invention relates to a mounting structure for mounting a vehicle interior material such as a resin garnish on a vehicle body.

2. Description of the Related Art

Although not shown in detail in a conventional mounting structure, a boss part is integrally formed to a rear surface of a vehicle interior material so as to protrude from the rear surface, and the vehicle interior material is mounted on a vehicle body by locking the boss part in a mounting hole punched through the vehicle body via a clip. In this respect, the clip used in the conventional mounting structure is an integrated molding part made of a synthetic resin, and includes a U-shaped body. One sidewall forming the U-shaped body is molded in a straight shape such that an engaging piece is formed on the inner surface thereof. The engaging piece is engaged with the engaging hole formed on the boss part. Further, the other sidewall forming the U-shaped body is molded in a state estranged from the one sidewall. While an inclined shoulder to be locked by an edge of the mounting hole of the vehicle body is formed on an outer surface of the other sidewall, catching pieces, which catch both sides of the boss part together with the one sidewall, are formed parallel to each other on an inner surface of the U-shaped body, so that engaging pieces with the same shape each other are formed on inner ends of the catching pieces facing the one sidewall (for example, see Japanese Design Registration No. 1067403).

In case that the vehicle interior material is actually mounted on the vehicle body, first, when the boss part of the vehicle interior material is inserted between one sidewall forming the U-shaped body of the clip and the catching pieces, the one sidewall and each of the engaging pieces formed on the catching pieces are engaged with the engaging hole from the both sides thereof. Therefore, remaining in this state, when the clip is inserted into a mounting hole punched through the vehicle body, the other sidewall forming the U-shaped body in a state, estranged from one sidewall, is bent inward and passes through the mounting hole so that the inclined shoulder thereof protruding outward is elastically locked by the edge of the mounting hole. For this reason, the vehicle interior material is mounted on the vehicle body.

Accordingly, the conventional mounting structure has an advantage that the vehicle interior material is mounted on the vehicle body through one-touch operation. However, when the boss part is inserted between the one sidewall forming the U-shaped body of the clip and the catching pieces, each of the engaging pieces closely facing each other must be pushed outward in order to force the boss part to be inserted therebetween. Therefore, there is a problem that a large force may be required to perform a work.

Furthermore, each of the catching pieces formed on the inner ends of the U-shaped body is individually flexible. Accordingly, when the boss part of the vehicle interior material is disengaged from the vehicle body by pulling the boss part, the catching pieces can be bent significantly toward the other sidewall with a relatively small force. For this reason, the engaging pieces are easily disengaged from the engaging hole of the boss part, and thus the clip remains on the mounting hole of the vehicle body. Therefore, there is a possibility that only the boss part is disengaged from the mounting hole. For this reason, when the vehicle interior material is again mounted on the vehicle body, the clip remaining on the mounting hole should be disengaged from the engaging hole and then is again mounted on the boss part, whereby it is impossible to escape a troublesome work.

SUMMARY OF THE INVENTION

The present invention has been finalized in view of the drawbacks inherent in the conventional structure, and it is an object of the present invention to solve the above-mentioned problems. In a mounting structure of a vehicle interior material according to a first aspect of the invention, a boss part protrudes from a rear surface of a vehicle interior material and the vehicle interior material is mounted on a vehicle body by locking the boss part in a mounting hole punched through the vehicle body via a clip. In this case, the clip has a U-shaped body, one sidewall forming the U-shaped body closely faces one surface of the boss part, and the other sidewall forming the U-shaped body faces the other surface of the boss part with a space therebetween. Furthermore, an engaging piece to be engaged with an engaging hole provided on the boss part is formed on the inner surface of the one sidewall, an engaging piece that faces the engaging hole provided on the boss part is formed on the inner surface of the other sidewall, and an inclined shoulder to be locked by an edge of the mounting hole is form on the upper outer surface of the other sidewall.

According to a second aspect of the invention, in the above-mentioned structure, it is preferable that the engaging piece formed on the one sidewall forming the U-shaped body and the engaging piece of the other sidewall forming the U-shaped body be formed not to be aligned to each other in the horizontal direction.

According to a third aspect of the invention, in the above-mentioned structure, it is preferable that the engaging piece formed on the one sidewall forming the U-shaped body be formed lower than the engaging piece of the other sidewall forming the U-shaped.

According to a fourth aspect of the invention, in the above-mentioned structure, it is preferable that the lower inner surface of the engaging hole provided on the boss part is formed inclined upward toward the engaging piece formed on the one sidewall.

According to a fifth aspect of the invention, in the above-mentioned structure, it is preferable that the other sidewall have a swelling wall portion formed on the lower inner surface thereof, and the protrusion height of the engaging piece formed on the one sidewall be set to be lower than that of the engaging piece formed on the other sidewall.

According to the first aspect of the invention, although the one sidewall forming the U-shaped body closely faces the boss part, the other sidewall forming the U-shaped body faces the boss part with a space therebetween. Accordingly, when the boss part of the vehicle interior material is inserted into the U-shaped body of the clip, the engaging piece formed on the other sidewall hardly functions. For this reason, a large force is not required to perform an inserting work, compared to the related art.

Furthermore, if the clip mounted on the boss part is inserted into the mounting hole, the other sidewall is bent inward and thus the inclined shoulder of the other sidewall is locked by the edge of the mounting hole. In this manner, the vehicle interior material is mounted on the vehicle body. However, in this state, when the boss part of the vehicle interior material is disengaged from the vehicle body by pulling the boss part, the inclined shoulder formed on the other sidewall slides the edge of the mounting hole and thus the other sidewall is bent significantly inward. Accordingly, in this case, the engaging piece formed on the other sidewall deeply enters the engaging hole so as to be engaged with the engaging hole, whereby it is possible to reliably prevent the clip from being disengaged from the boss part.

According to the second aspect of the invention, since the engaging piece formed on the one sidewall and the engaging piece of the other sidewall are formed not to be aligned to each other in the horizontal direction, it is possible to set each protrusion height of the engaging pieces as high as possible. Therefore, it is difficult to disengage the boss part from the engaging hole.

According to the third aspect of the invention, since the engaging piece formed on the one sidewall closely facing the boss part is formed lower than the engaging piece formed on the other facing the boss part with a space therebetween, relative mounting positions of the boss part and the clip are constant without variation. Therefore, mounting accuracy is improved. Furthermore, when the clip mounted on the boss part is inserted into the mounting hole of the vehicle body, the other sidewall is bent inward and thus the engaging piece of the other sidewall does not graze against the edge of the mounting hole. Accordingly, insertion force for inserting the clip may be made small.

According to the fourth aspect of the invention, since the lower inner surface of the engaging hole provided on the boss part is formed inclined upward toward the engaging piece formed on the one sidewall, the engaging piece of the one sidewall to be consistently engaged with the engaging hole forms an edge to be caught by the upwardly inclined surface, thereby being securely engaged with the engaging hole.

According to the fifth aspect of the invention, when the boss part is inserted into the U-shaped body of the clip, the one sidewall and the other sidewall are flexible outward so that the boss part is inserted therebetween without any inhibition. However, when the end of the boss part is brought into contact with the swelling wall portion formed on the other sidewall and then is further inserted into the inside of the U-shaped body, the boss part is elastically caught between the one sidewall and the swelling wall portion, so that the position of the boss part is regulated. Therefore, afterwards, the other sidewall itself is estranged from the surface of the boss part so that the engaging piece is not significantly involved in the insertion. Furthermore, since the protrusion height of the engaging piece formed on the one sidewall is set to be lower than that of the engaging piece formed on the other sidewall, insertion force for inserting the clip may be made small.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

In the invention, one sidewall forming the U-shaped body of the clip closely faces the boss part of the vehicle interior material, and the other sidewall forming the U-shaped body of the clip the other sidewall forming the U-shaped body faces the other surface of the boss part with a space therebetween. Further, an engaging piece to be engaged with an engaging hole provided on the boss part is formed on the inner surface of the one sidewall, an engaging piece that faces the engaging hole provided on the boss part is formed on the inner surface of the other sidewall, and an inclined shoulder to be locked by an edge of the mounting hole is form on the upper outer surface of the other sidewall. Accordingly, it is possible to easily insert the boss part into the U-shaped body and to effectively prevent the clip from being disengaged from the boss part.

Hereinafter, the invention will be described in detail with reference to a preferred embodiment. As well as the related art, a mounting structure according to the preferred embodiment of the invention is purposely designed so that a boss part B is integrally formed to a rear surface of a vehicle interior material G such as a resin garnish so as to protrude from the rear surface and the vehicle interior material G is mounted on a vehicle body panel P by locking the boss part B in a mounting hole H punched through the vehicle body panel P via a clip C. However, the above-mentioned preferred embodiment employs structures to be described below, in order to make differences.

Figure 1:
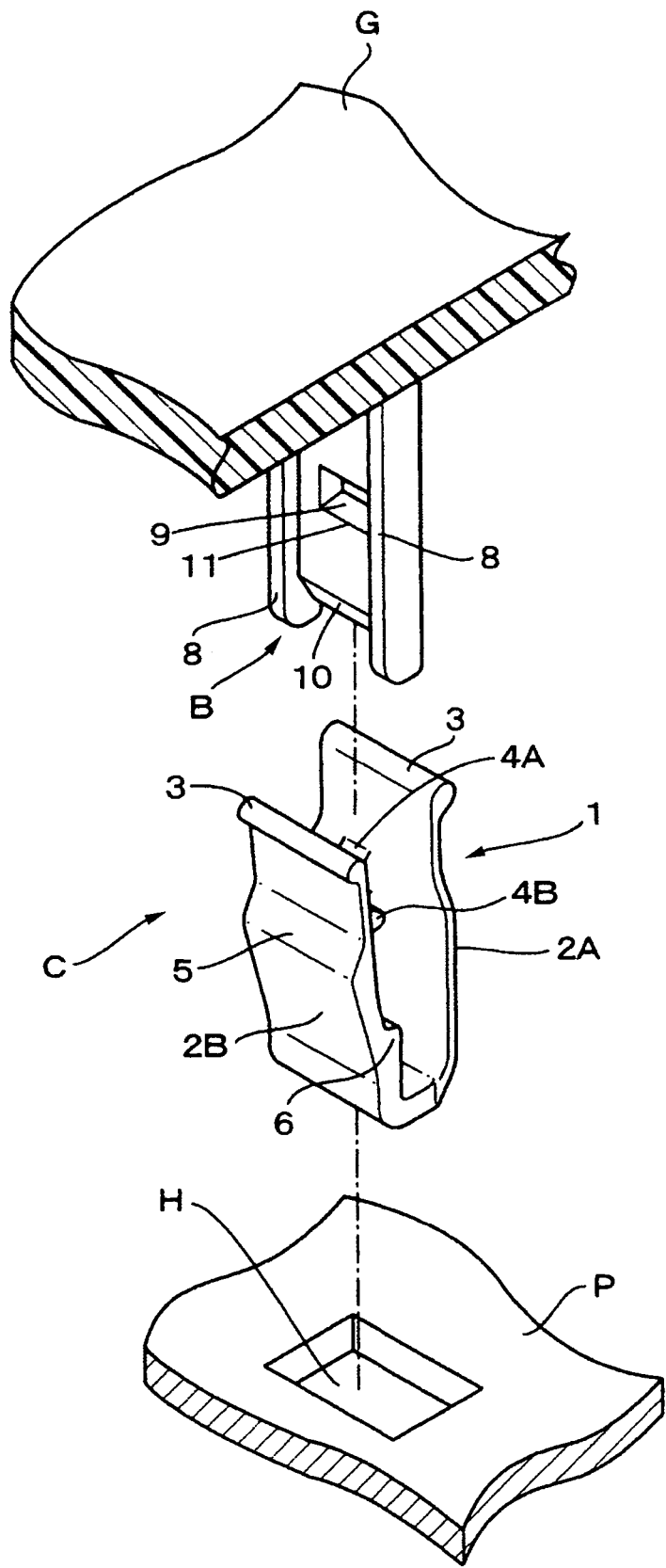
FIG. 1 is an exploded perspective view showing main parts of a mounting structure of a vehicle interior material according to an embodiment of the invention.
Figure 2A:
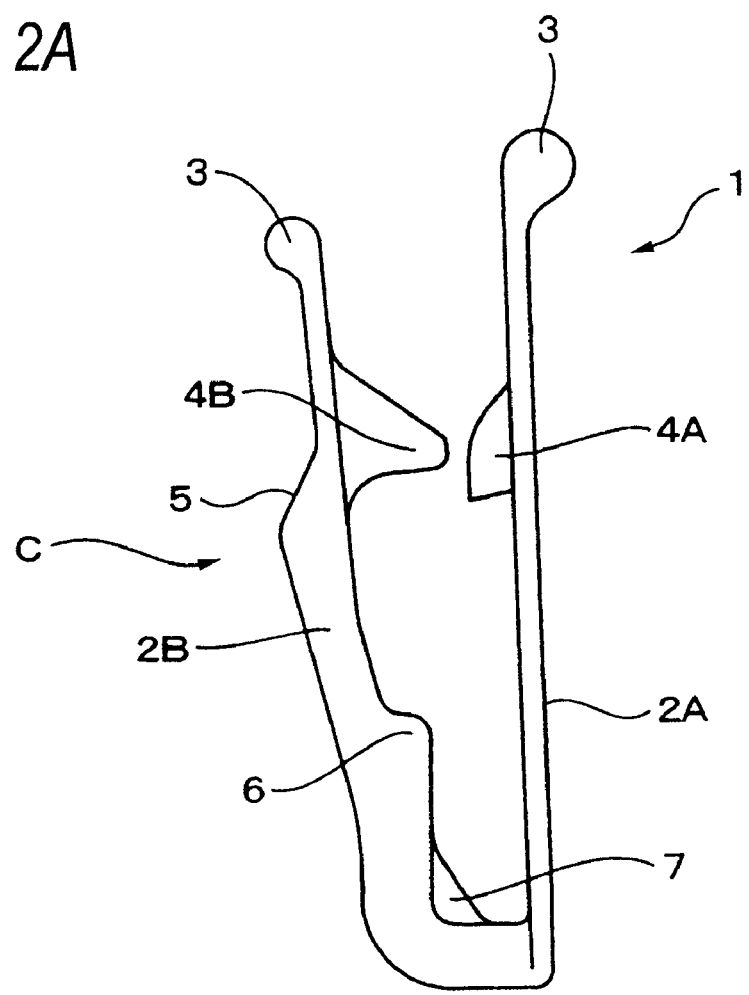
FIG. 2A is a front view showing a clip used in the embodiment.
Figure 2B:
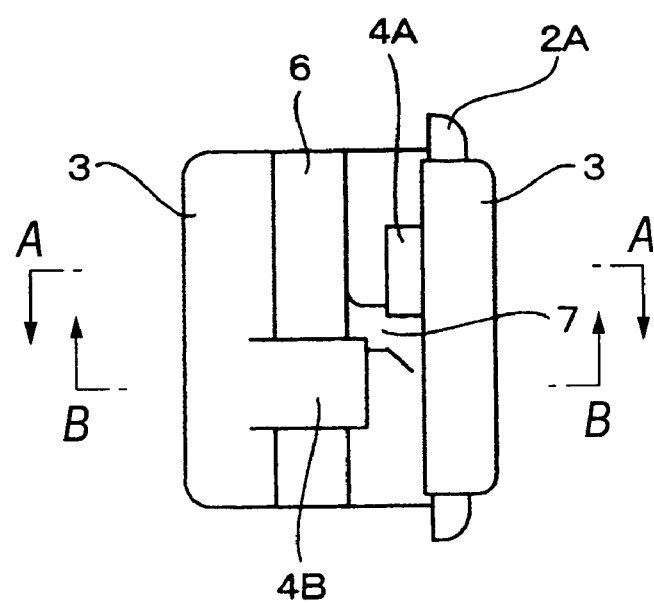
FIG. 2B is a plan view showing the same.
Figure 3A:
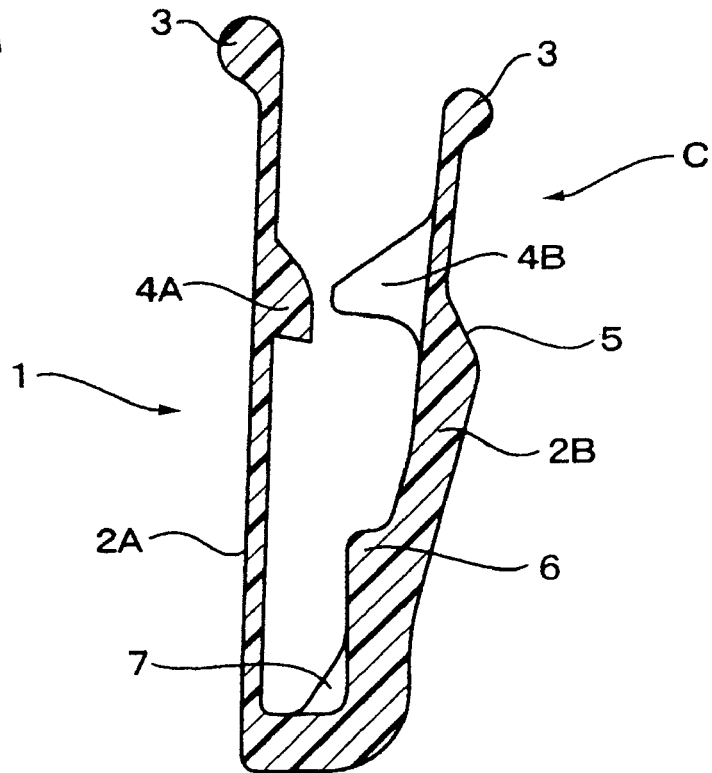
FIG. 3A is a cross-sectional view taken along a line A-A shown in FIG. 2B.
Figure 3B:
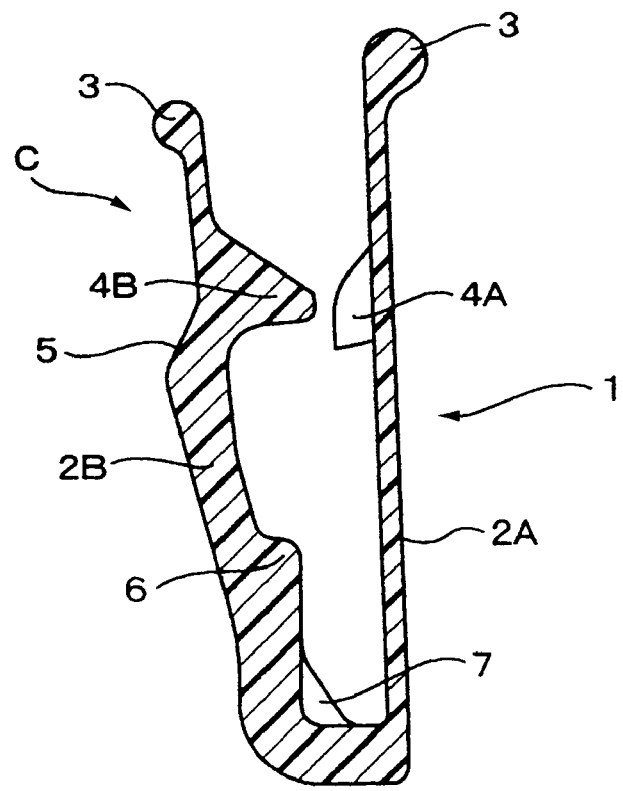
FIG. 3B is a cross-sectional view taken along a line B-B shown in FIG. 2B.

First, the clip C will be described. The clip C is an integrated molding part made of a synthetic resin, and includes a U-shaped body 1 as shown in FIGS. 2 and 3. One sidewall 2A forming the U-shaped body 1 has a straight shape and closely faces one surface of the boss part B. An enlarged portion 3 having a substantially circular shape is formed on the upper end of the sidewall 2A, and the sidewall 2A has an engaging piece 4A that is formed to protrude inward from the upper inner surface thereof and is engaged with an engaging hole 9, to be described below, provided on the boss part B.

In addition, the other sidewall 2B forming the U-shaped body 1 is formed in a state estranged from the one sidewall 2A to face the other surface of the boss part B with a space therebetween. Similar to the sidewall 2A, an enlarged portion 3 having a substantially circular shape is formed on the upper end of the other sidewall 2B, and the other sidewall 2B has an engaging piece 4B that protrudes inward from the upper inner surface thereof and faces an engaging hole 9 provided on the boss part B. Further, an inclined shoulder 5 that is locked by an edge of the mounting hole H of the vehicle body panel P is formed to protrude outward from the upper outer surface of the other sidewall 2B. Meanwhile, the other sidewall 2B has a swelling wall portion 6 formed on the lower inner surface thereof over a predetermined range so that the swelling wall portion closely faces the other surface of the boss part B.

Moreover, the other sidewall 2B has an inclined wall 7 for preventing an installation error that protrudes from a lower portion to a bottom portion of the swelling wall portion 6.

Furthermore, as shown, relations between the engaging piece 4A formed on one sidewall 2A and the engaging piece 4B formed on the other sidewall 2B are as follows: both of them are formed not to be aligned to each other on the left and right in the horizontal direction, the engaging piece 4A formed on one sidewall 2A is formed lower than the engaging piece 4B formed on the other sidewall 2B in the vertical direction, and the protrusion height of the engaging piece 4A formed on one sidewall 2A is set to be lower than that of the engaging piece 4B formed on the other sidewall 2B. In particular, since both of them are formed not to be aligned to each other on the left and right in the horizontal direction in the present embodiment, the engaging pieces 4A and 4B are prevented from being overlapped with each other. Accordingly, it is possible to set each protrusion height of the engaging pieces 4A and 4B as high as possible.

Figure 4A:
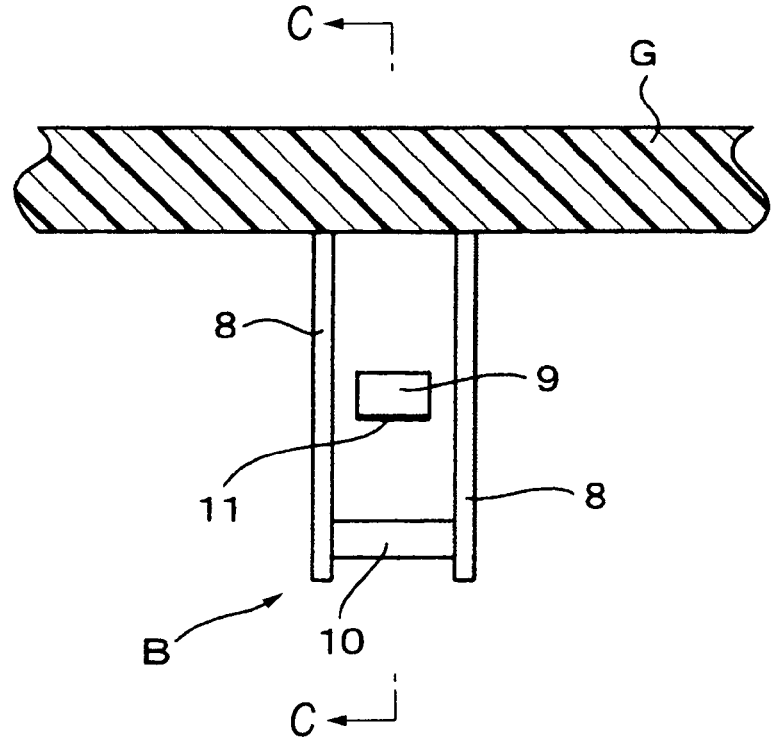
FIG. 4A is a front view showing main portions of a boss part according to the embodiment and FIG. 4B is a cross-sectional view taken along a line C-C shown in FIG. 4A.
Figure 4B:
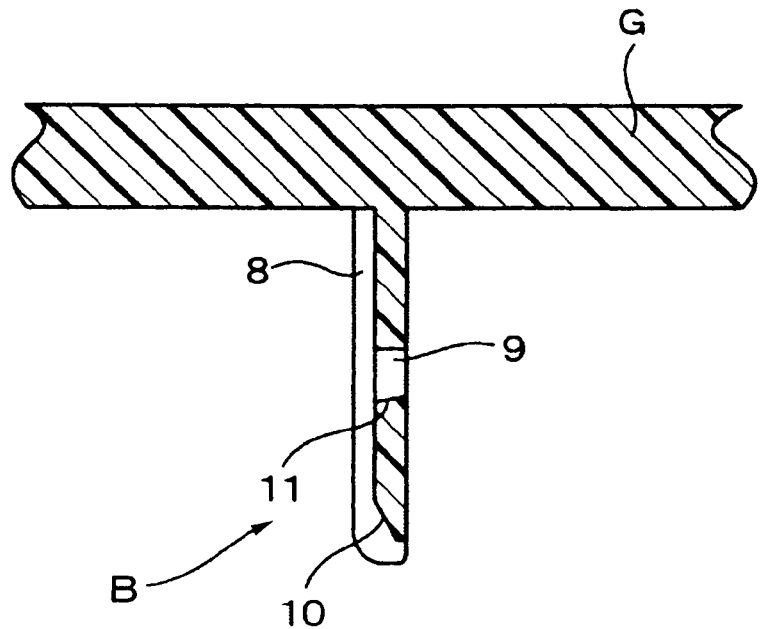

In addition, as shown in FIG. 4, the boss part B of the vehicle interior material G is formed in a plate shape, and has wide guide walls 8 extending from the both side edges of the boss part B only toward the other surface thereof. Then, the clip C is mounted between the guide walls 8. The boss part B has an engaging hole 9 provided at a position corresponding to the engaging pieces 4A and 4B, which are formed not to be aligned to each other on left and right, and can be engaged with the engaging pieces 4A and 4B. In addition, the boss part B has a tapered surface portion 10 on the lower edge thereof, which is formed in a shape similar to the inclined wall 7 for preventing an installation error. Furthermore, as shown in FIG. 4, an inclined surface 11 is significantly formed on the lower inner surface of the engaging hole 9 so as to be inclined upward toward the engaging piece 4A formed on the one sidewall 2A.

Figure 5:
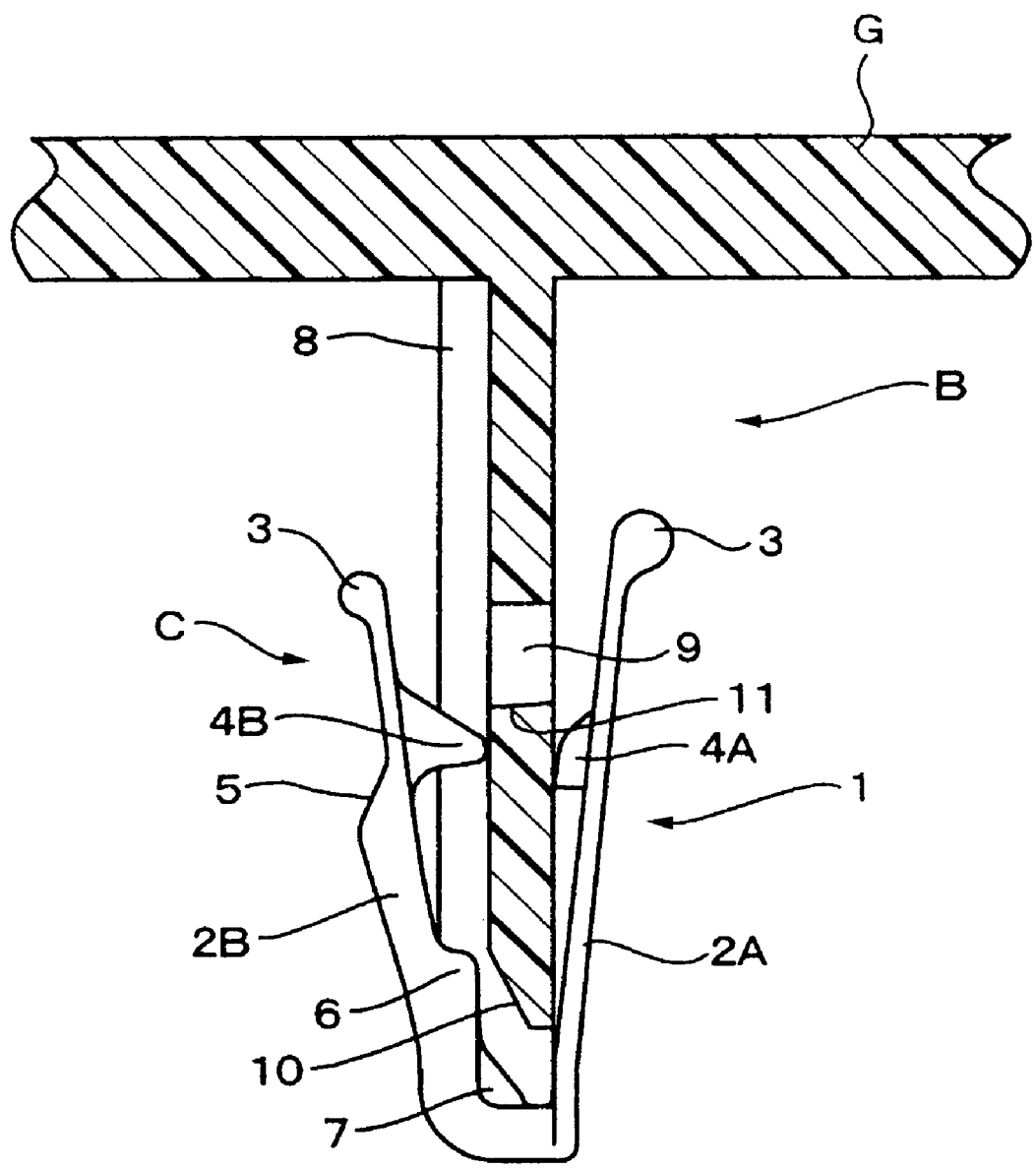
FIG. 5 is a cross-sectional view showing a state in which the boss part of the vehicle interior material is being inserted into a U-shaped body of the clip.

In face, in the mounting structure having above-mentioned, when the vehicle interior material G is mounted on the vehicle body panel P, the direction of the inclined wall 7 first coincides with the direction of the tapered surface portion 10, and thus the boss part B protruding from the rear surface of the vehicle interior material G is inserted into the U-shaped body 1 of the clip C. In this case, although the one sidewall 2A forming the U-shaped body 1 closely faces the boss part B, the other sidewall 2B faces the boss part B with a space therebetween. Accordingly, since the engaging piece 4B formed on the other sidewall 2B hardly functions, at an initial stage, as shown in FIG. 5, the one sidewall 2A and the other sidewall 2B are flexible outward so that the boss part is inserted therebetween without any inhibition. However, when the end of the boss part B is brought into contact with the swelling wall portion 6 formed on the other sidewall 2B and then is further inserted into the inside of the U-shaped body, the boss part B is elastically caught by the one sidewall 2A and the swelling wall portion 6, so that the position of the boss part is regulated. For this reason, afterwards, the boss part B is inserted into the inside of the U-shaped body with the one sidewall 2A bent as much as the protrusion height of the engaging piece 4A.

Figure 6:
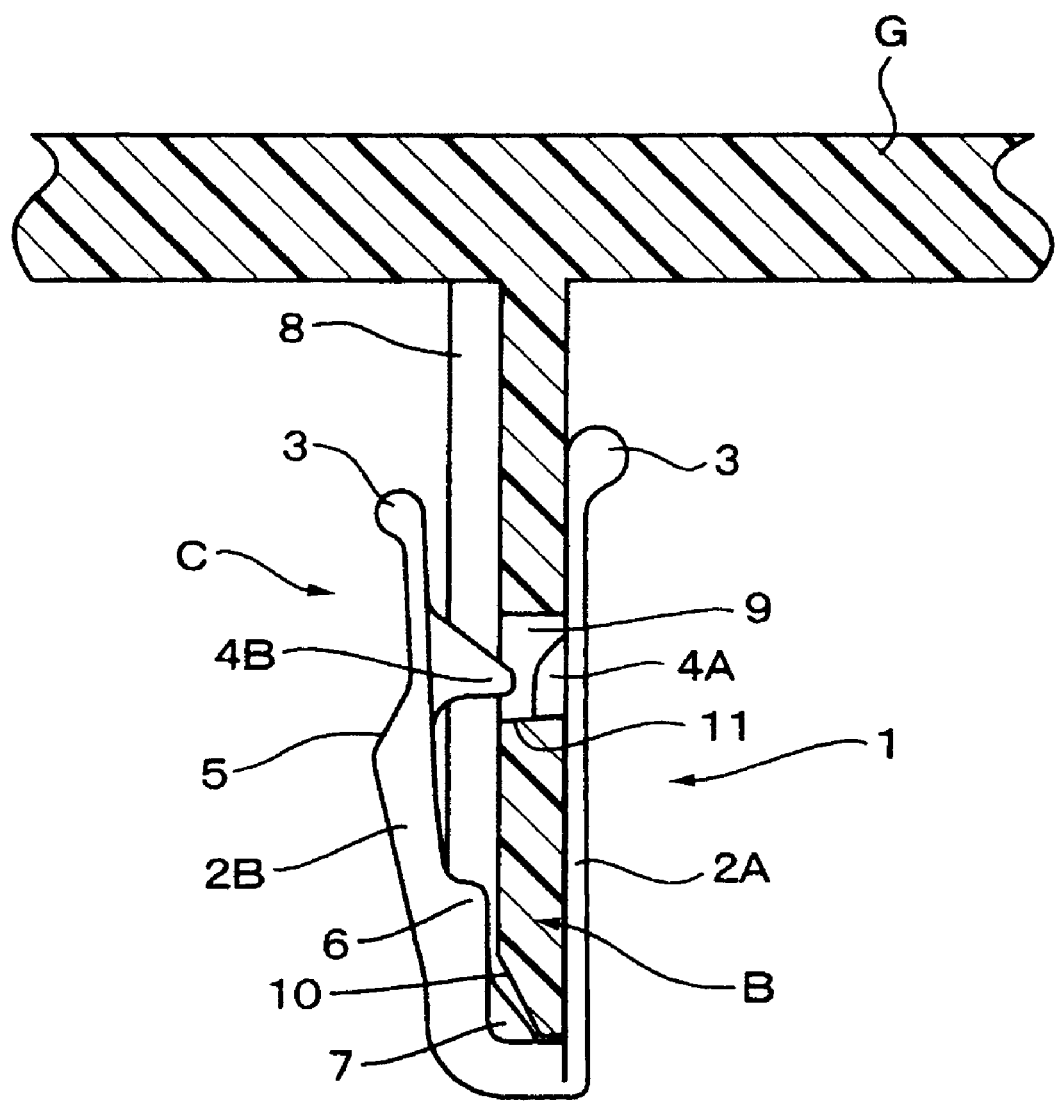
FIG. 6 is a cross-sectional view showing a state in which the boss part of the vehicle interior material is completely inserted into a U-shaped body of the clip.

Afterwards, when the boss part B is completely inserted into the inside of the U-shaped body 1, as shown in FIG. 6, the engaging piece 4A formed on the one sidewall 2A is securely engaged with the inclined surface 11 that is formed on the lower inner surface of the engaging hole 9 of the boss part B. Accordingly, the clip C itself is securely mounted on the boss part B. However, since the end of the engaging piece 4B formed on the other sidewall 2B is slightly inserted into the engaging hole, the engaging piece 4B is not completely engaged with the engaging hole 9 in contrast to the engaging piece 4A formed on the one sidewall 2A.

In the present embodiment, mounting force for mounting the clip C on the boss part B becomes larger as the protrusion height of the engaging piece 4A formed on one sidewall 2A increases. However, as described above, since the protrusion height of the engaging piece 4A formed on one sidewall 2A is set to be lower than that of the engaging piece 4B formed on the other sidewall 2B, insertion force for inserting the boss part B can be made as small as the set height of the lower protrusion. That is, the smaller the protrusion, the less insertion force. Furthermore, since the engaging piece 4A that is formed on the one sidewall 2A closely facing the boss part B is formed lower than the engaging piece 4B that is formed on the other sidewall 2B facing the boss part B with a space therebetween in the vertical direction, relative mounting positions of the boss part B and the clip C are defined constant without variation, thereby improving mounting accuracy.

Figure 7:
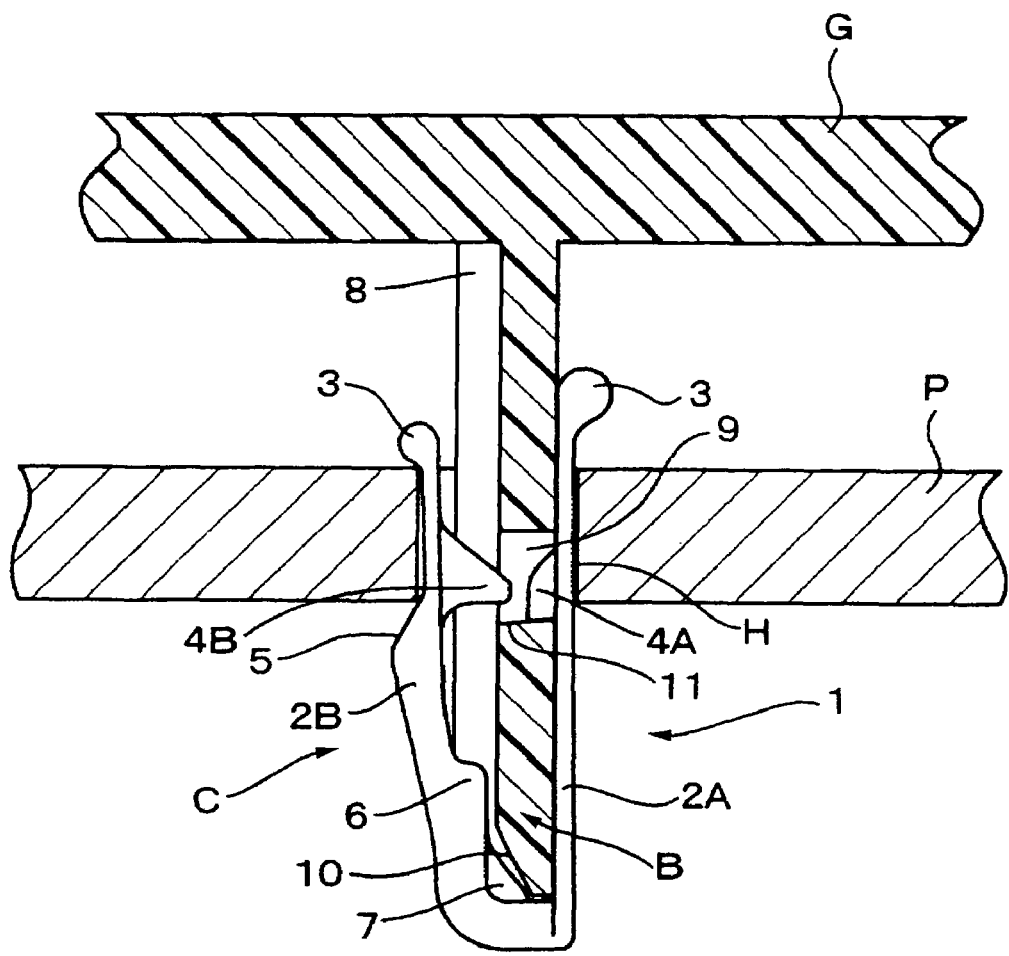
FIG. 7 is a cross-sectional view showing a state in which the vehicle interior material is mounted on the vehicle body panel.

Afterwards, remaining in this state, when the clip C is inserted into the mounting hole H of the vehicle body panel P, as shown in FIG. 7, the other sidewall 2B forming the U-shaped body 1 is bent inward and passes through the mounting hole so that the inclined shoulder 5 is elastically locked by an edge of the mounting hole H. Accordingly, the vehicle interior material G is mounted on the vehicle body panel P through one-touch operation. Moreover, in this case, as the other sidewall 2B is bent inward, the engaging piece 4B is also further engaged with the engaging hole 9, though not completely.

In addition, in case that the clip C mounted on the boss part B is inserted into the mounting hole H of the vehicle body panel P, when the other sidewall 2B is bent inward for the engaging piece 4B to enter the engaging hole 9 of the boss part B, the engaging piece 4B exists above the engaging piece 4A and the inclined surface 11 formed on the lower surface of the engaging hole 9 is formed inclined downward toward the engaging piece 4B. Therefore, the engaging piece 4B does not graze against the edge of the mounting hole H, and thus insertion force for inserting the clip C can be made small.

In contrast, the inclined surface 11 formed on the lower surface of the engaging hole 9 is formed inclined upward toward the engaging piece 4A formed on one sidewall 2A. Therefore, the engaging piece 4A to be consistently engaged with the engaging hole 9 forms an edge to be caught on the inclined surface 11 formed on the lower surface of the engaging hole and to be securely engaged with the engaging hole 9. In this respect, it is preferable that a lower surface of the engaging piece 4A formed on one sidewall 2A be formed in a tapered shape similar to the inclined surface 11 as well.

Figure 8:
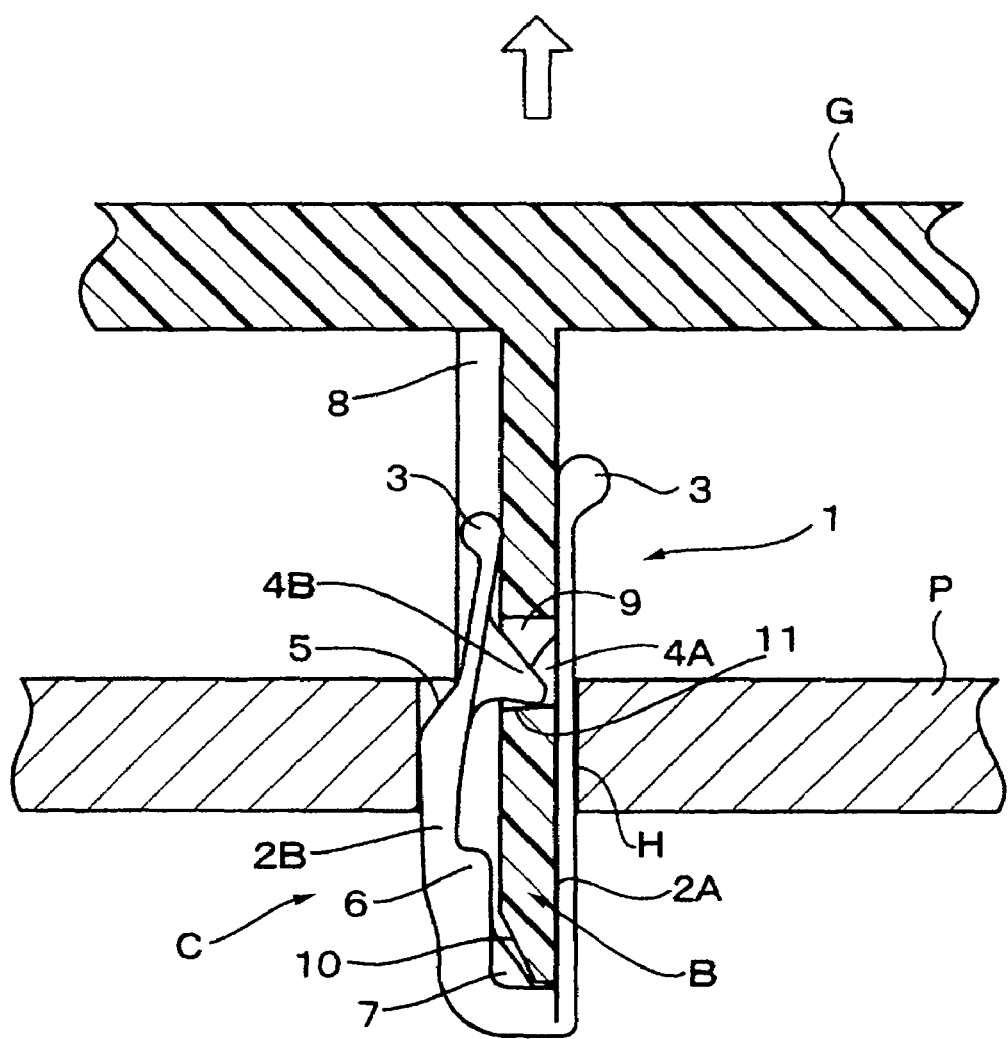
FIG. 8 is a cross-sectional view showing a state in which the vehicle interior material is disengaged from the vehicle body panel.

When the boss part B of the vehicle interior material G is disengaged from the vehicle body panel P in order to release the vehicle interior material G from the vehicle body panel P by pulling the boss part B, the boss part B is drawn from the mounting hole H of the vehicle body panel P. In this case, as shown in FIG. 8, the inclined shoulder 5 formed on the other sidewall 2B slides the edge of the mounting hole H, and thus the other sidewall 2B is bent significantly inward. However, since the engaging piece 4B formed on the other sidewall 2B deeply enters the engaging hole 9 so as to be engaged with the engaging hole 9, it is possible to reliably prevent the clip C from being disengaged from the boss part B.

For this reason, in the present embodiment, the clip C is drawn from the mounting hole H of the vehicle body panel P while being mounted on the boss part B. Therefore, unlike the related art, when the vehicle interior material G is again mounted on the vehicle body panel P, it is unnecessary that the clip C remaining on the mounting hole H be disengaged therefrom and then be again mounted on the boss part B, thereby promising an improved work efficiency.

In the mounting structure of a vehicle interior material according to the invention, it is possible to easily insert the boss part into the U-shaped body and to efficiently prevent the clip from being disengaged from the boss part. Therefore, it is very convenient to mount a resin garnish of a vehicle or the like on the vehicle body.

What is claimed is:

1. A mounting structure of a vehicle interior material, comprising:
   a boss part protruded from a rear surface of a vehicle interior material;
   a clip which has a U-shaped body;
   a mounting hole punched through the vehicle body via the clip;
   a first engaging piece to be engaged with an engaging hole provided on the boss part;
   a second engaging piece that faces the engaging hole provided on the boss part; and
   an inclined shoulder to be locked by an edge of the mounting hole,
   wherein the vehicle interior material is mounted on a vehicle body by locking the boss part in the mounting hole,
   wherein one sidewall forming the U-shaped body closely faces one surface of the boss part, and the other sidewall forming the U-shaped body faces the other surface of the boss part with a space therebetween, the one sidewall being formed by a single continuous wall and the other sidewall being formed by a single continuous wall, and
   wherein the first engaging piece is formed on the inner surface of the one sidewall,
   wherein the second engaging piece is formed on the inner surface of the other sidewall, and
   wherein the inclined shoulder is formed on the upper outer surface of the other sidewall.

2. The mounting structure of a vehicle interior material according to claim 1, wherein the first engaging piece and the second engaging piece are formed not to be aligned to each other in the horizontal direction defined by a direction substantially parallel to an exterior surface of the vehicle interior material.

3. The mounting structure of a vehicle interior material according to claim 1 wherein the first engaging piece is formed lower than the second engaging piece.

4. The mounting structure of a vehicle interior material according to claim 1, wherein the lower inner surface of the engaging hole provided on the boss part is formed inclined upward toward the first engaging piece.

5. The mounting structure of a vehicle interior material according to claim 1, wherein the other sidewall has a swelling wall portion formed on the lower inner surface thereof, and the protrusion height of the first engaging piece is set to be lower than that of the second engaging piece.

6. The mounting structure of a vehicle interior material according to claim 1, wherein the one sidewall comprises a single planar surface.

7. The mounting structure of a vehicle interior material according to claim 5, wherein the swelling wall portion engages a surface of the boss part.

8. The mounting structure of a vehicle interior material according to claim 1, wherein the one sidewall comprises an enlarge portion having a substantially circular shape at an upper end of the one sidewall.

9. The mounting structure of a vehicle interior material according to claim 1, wherein the first engaging piece and the second engaging piece comprise dissimilar shapes.

10. The mounting structure of a vehicle interior material according to claim 1, wherein the other sidewall is formed at an angle greater then an angle of the one sidewall.

11. A mounting structure of a vehicle interior material according, comprising:
    a boss part protruded from a rear surface of a vehicle interior material;
    a clip comprising a U-shaped body;
    a mounting hole punched through the vehicle body via the clip;
    a first engaging piece to be engaged with an engaging hold provided on the boss part;
    a second engaging piece that faces the engaging hole provided on the boss part; and
    an inclined shoulder to be locked by an edge of the mounting hole, wherein:
      the vehicle interior material is mounted on a vehicle body by locking the boss part in the mounting hole;
      one sidewall forming the U-shape body closely faces one surface of the boss part, and an other sidewall forming the U-shape body faces an other surface of the boss part with a space therebetween;
      the first engaging piece is formed on an inner surface of the one sidewall;
      the second engaging piece is formed on an inner surface of the other sidewall; and
      the inclined shoulder is formed on an upper outer surface of the other sidewall, wherein:
    the first engaging piece and the second engaging piece are capable of by-passing one another in an engaged state.

12. A mounting structure of a vehicle interior material, comprising:
    a U-shape body;
    a first sidewall forming a first side of the U-shape body, the first sidewall being substantially planar;
    a second sidewall, disposed opposite the first sidewall, forming a second side of the U-shape body, the second sidewall being substantially planar;
    a first engaging piece that protrudes from an inner surface of the first sidewall toward the second sidewall;
    a second engaging piece that protrudes from an inner surface of the second sidewall toward the first sidewall; and
    an inclined shoulder formed on an outer surface of the second sidewall,
    wherein the first engaging piece and the second engaging piece are formed so as to be capable of by-passing one another in an engaged state,
    wherein one of the first engaging piece and the second engaging piece protrudes farther than the other of the first engaging piece and the second engaging piece.

13. A mounting structure of a vehicle interior material, comprising:
    a U-shape body;
    a first sidewall forming a first side of the U-shaped body, the first sidewall being substantially planar;
    a second sidewall, disposed opposite the first sidewall, forming a second side of the U-shape body, the second sidewall being substantially planar;
    a first engaging that protrudes from an inner surface of the first sidewall toward the second sidewall;

a second engaging piece that protrudes from an inner surface of the second sidewall toward the first sidewall; and an inclined shoulder formed on an outer surface of the second sidewall, wherein the first engaging piece and the second engaging piece are formed so as to be capable of by-passing one another in a engaged state.

* * * * *